United States Patent [19]

Payne et al.

[11] Patent Number: 5,441,231
[45] Date of Patent: Aug. 15, 1995

[54] VALVE CLOSING ACTUATOR

[76] Inventors: Barrett M. M. Payne, 9 Caithness Road, Hillside, Bulawayo; John L. Sullivan, 4 Stuttaford Road, Fortunes Gate, Bulawayo, both of Zimbabwe

[21] Appl. No.: 245,028
[22] Filed: May 17, 1994
[51] Int. Cl.[6] .............................. F16K 7/07
[52] U.S. Cl. .......................... 251/5; 251/7; 251/61
[58] Field of Search .............. 251/5, 7, 4, 9, 10, 251/61, 61.1

[56] References Cited

U.S. PATENT DOCUMENTS

| | | | |
|---|---|---|---|
| 3,695,576 | 10/1972 | Kane et al. | 251/5 |
| 3,737,139 | 6/1973 | Watts | 251/5 X |
| 4,135,550 | 1/1979 | Andersson | 251/5 X |

*Primary Examiner*—Martin P. Schwadron
*Assistant Examiner*—Kevin L. Lee
*Attorney, Agent, or Firm*—Ladas & Parry

[57] ABSTRACT

There is provided a valve for use in regulating flow of fluid through a conduit having a deformably resilient valve sleeve, in which the valve includes a housing, and at least first and second opposing jaw members disposed transversely to the conduit for deforming the valve sleeve with the conduit sandwiched between the first and second opposing jaw members. The jaw members are movable between an open position, with the first and second jaw members spaced apart a distance sufficient to permit flow of liquid through the conduit, and a closed position, with the jaw members pinched together sufficiently to restrict or shut off the flow of fluid through the conduit. Inflatable diaphragms are provided to control movement of the jaw members between the open position, when the diaphragms are in a deflated configuration, and the closed position, when the diaphragms are in an inflated configuration.

8 Claims, 4 Drawing Sheets

VALVE CLOSING ACTUATOR

FIELD OF INVENTION

This invention relates to vane closure means and is particularly directed to providing means adapted for closure of pinch-type valves.

BACKGROUND OF INVENTION

Pinch valve closures comprising air and hydraulic pistons and cylinders are known in the art. However, conventional pinch valves require large fluid volumes for effecting closure and, in addition, require, for example, honed internal cylinder walls, micro-ground piston shafts, fluid piston seals, guide rings, shaft seals and the like. Moreover, conventional pinch vanes are prone to a so-called crushing effect. This is a serious defect wherein a valve sleeve is overly compressed with a resultant fracture or delamination of the valve sleeve. There has accordingly been a need for a less complex valve closure which will avoid the defects of the conventional valves.

SUMMARY OF THE INVENTION

It is therefore an object of the invention to provide an improved valve which overcomes the defects of conventional valves and which has fewer mechanical parts that can cause problems.

It is another object of the invention to provide a valve which requires less fluid volume for closure.

It is a further object of the invention to provide a valve which will allow compression of a valve sleeve without crushing the sleeve to a point where it fractures or delaminates.

It is yet a further object of the invention to provide a simple method for regulating fluid flow through a conduit having deformably resilient walls.

In accordance with these and other objects of the invention, there is disclosed a valve for use in regulating flow of fluid through a conduit having a deformably resilient valve sleeve, in which the valve includes a housing, and at least first and second opposing jaw members disposed transversely to the conduit for deforming the valve sleeve with the conduit sandwiched between the first and second opposing jaw members. The jaw members are movable between an open position, with the first and second jaw members spaced apart a distance sufficient to permit flow of liquid through the conduit, and a closed position, with the jaw members pinched together sufficiently to restrict or shut off the flow of fluid through the conduit. Inflatable diaphragms are provided to control movement of the jaw members between the open position, when the diaphragms are in a deflated configuration, and the closed position, when the diaphragms are in an inflated configuration.

In one embodiment of the invention, the housing defines first and second cavities. A first inflatable diaphragm is disposed within the first cavity between the housing and the first jaw member, and a second inflatable diaphragm is disposed within the second cavity between the housing and the second jaw member. The first and second inflatable diaphragms and the first and second cavities may each be substantially triangular in cross section.

In another embodiment of the invention, the first and second jaw members each has a straight edge having a plurality of notches, with the notches of the first and second jaw members being aligned relative to the straight edges and relative to each other such that the jaw members can deform the conduit walls more in certain portions than in others. In a preferred embodiment, the jaw members deform the conduit walls so that the conduit displays a dumbbell shape in cross section when the jaw members are in the closed position. In this way, the jaw members can compress the valve sleeve without fracturing or delaminating the conduit.

In accordance with the aforementioned objects of the invention, there is also provided a method for regulating flow of fluid through a conduit having a deformably resilient valve sleeve. The method comprises at least partly encircling the conduit with a valve of the invention such that the conduit is sandwiched between the first and second jaw members with the diaphragms in the deflated configuration and than inflating the diaphragms to the inflated configuration to restrict the flow of fluid through the conduit.

DESCRIPTION OF THE PREFERRED EMBODIMENT

Figure 1:
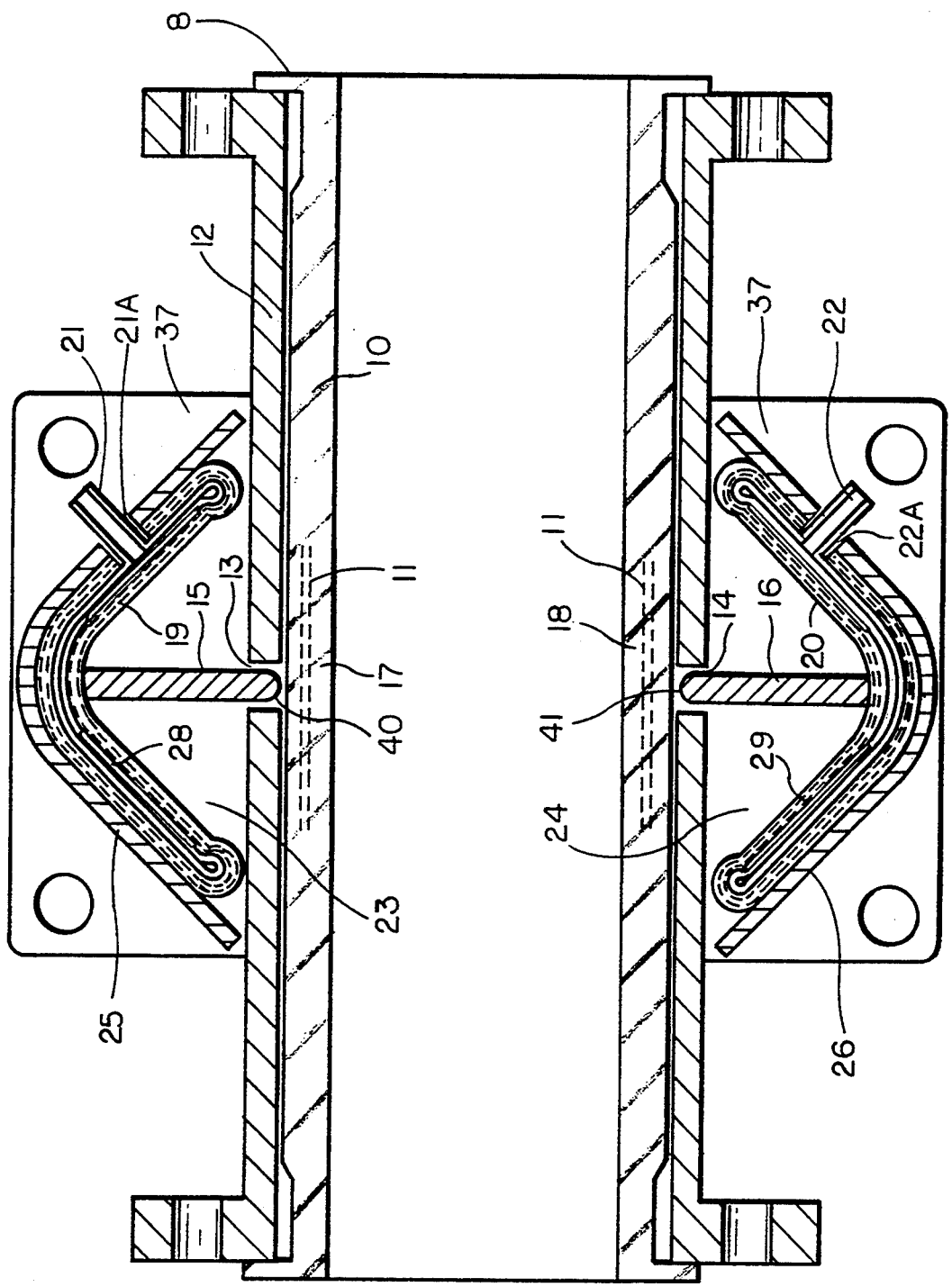
FIG. 1 is a cross sectional side view of a closure valve of the invention disposed about the valve sleeve of a conduit with the valve in a fully open configuration.

Referring to the drawings, in which the same reference numerals are used in different figures to identify identical parts, numeral 8 indicates a conduit having a deformably resilient valve sleeve 10 including a reinforcing braid element 11 interwoven into the body of the sleeve 10. The conduit 8 is retained in a rigid, metal housing 12 which is provided with a pair of jaw slots 13 and 14 in which jaws 15 and 16 are slidably and guidably supported to impinge upon peripheral zones 17 and 18 of the sleeve 10.

Figure 2:
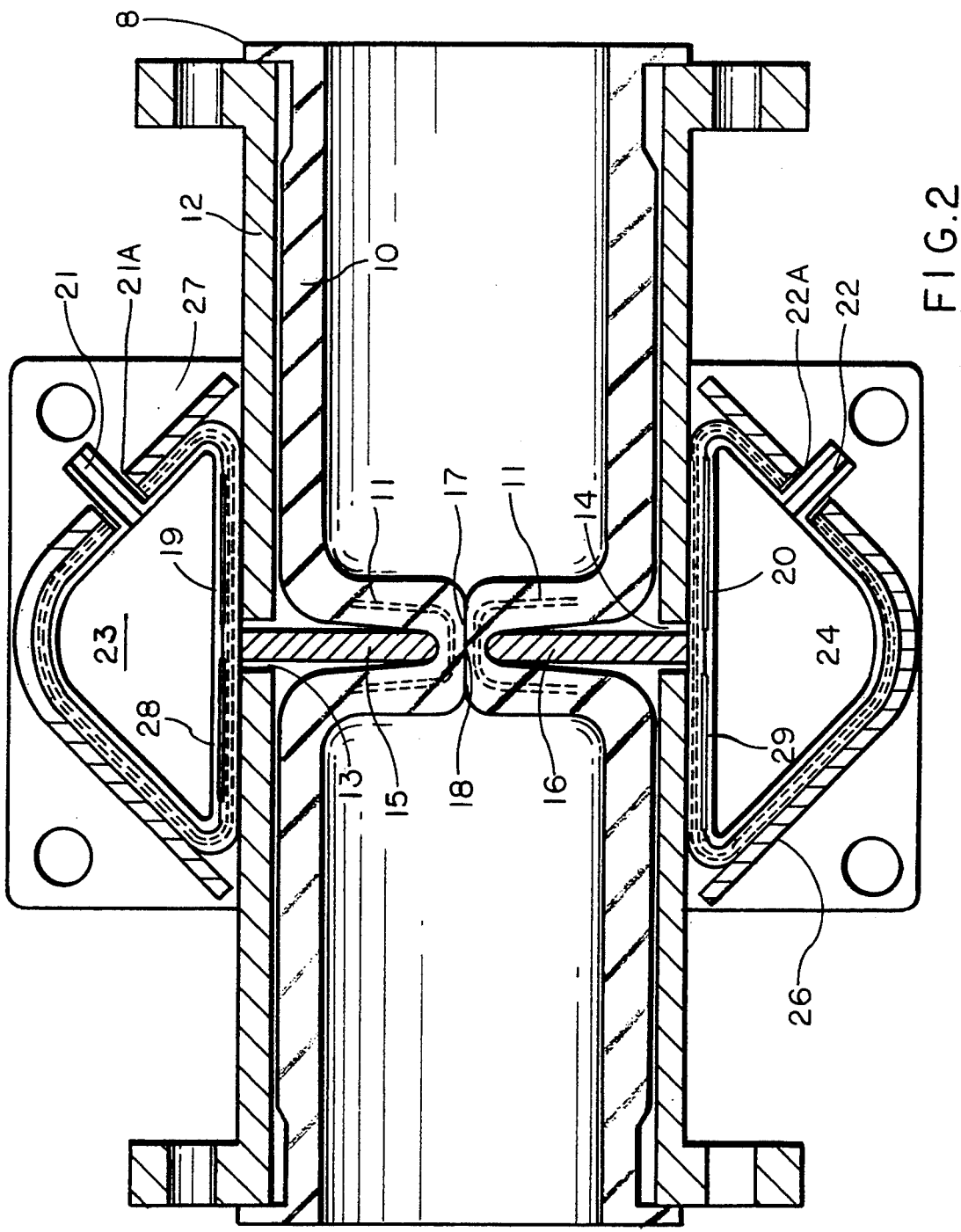
FIG. 2 is a cross sectional side view of the closure valve and vane sleeve of FIG. 1 with the valve in a fully closed, pinched configuration.

Jaws 15 and 16 are associated with diaphragms 19 and 20 respectively which are adapted to be inflated through respective nozzles 21 and 22 from a fluid pressure source (not shown) from the deflated configuration shown in FIG. 1 to the inflated configuration shown in FIG. 2. The nozzles 21 and 22 extend through openings 21A and 22A respectively. Diaphragms 19 and 20 are contained within substantially triangularly shaped cavities shown generally by numerals 23 and 24. These cavities are created by reinforcing members 25 and 26 which form part of the closure housing 27 which is adapted at least partially to embrace valve sleeve 10.

In a presently preferred form of the invention, diaphragms 19 and 20 are constructed from flat transmission belting reinforced by spring seal plates 28 and 29 respectively.

Figure 4:
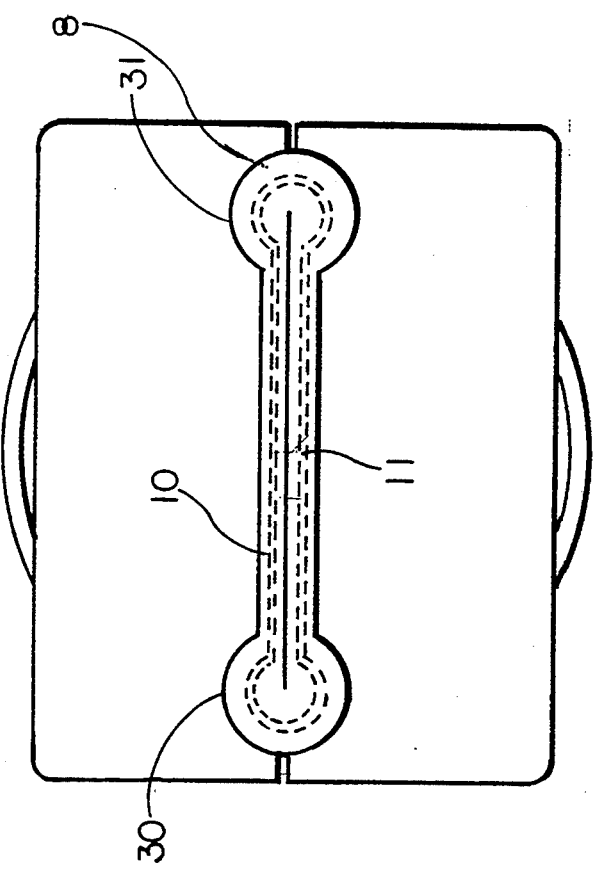
FIG. 4 is an end elevation view of opposing jaw members of the valve in a fully pinched, closed configuration and showing a dumbbell shape.

In FIG. 2, sleeve 10 is shown in a pinched configuration with jaws 15 and 16 having been driven towards each other by expansion of the diaphragms 19 and 20 so that the diaphragms 19 and 20 occupy substantially the whole of the triangular cavities 23 and 24 as illustrated. Reference to FIG. 4 indicates that the jaws 15 and 16 have deformed the valve sleeve 10 to a dumbbell shape shown at 30 and 31. This shape is created by the particular configuration of the jaws 15 and 16, the purpose of which is to minimize the crushing effect upon sleeve 10 when in the pinched configuration.

It will be apparent to those skilled in the art that the design and construction of the closure member as illustrated herein with reference to the drawings results in a positive closure of a pinch-type valve and it has been found in practice that the particular design of the diaphragm members 19 and 20 in association with the substantially triangular cross section cavity arrangement 23 and 24 allows the use of almost any closure fluid such as air, gas, water, oil or even grease. Moreover, the actual fluid volume required for operation of the closure valve is only approximately half of that required to effect closure of the same stroke and force as in conventional known air and hydraulic pistons and cylinders. In addition, there are considerable advantages in the construction of the present closure. For example, it does not need honed internal cylinder walls or chrome-plated and micro-ground piston shafts or the like. It also does not require fluid piston seals and glide rings, shaft seals or the like. Nor does it require filtrational lubrication of the actuating fluid, among others.

Figure 3:
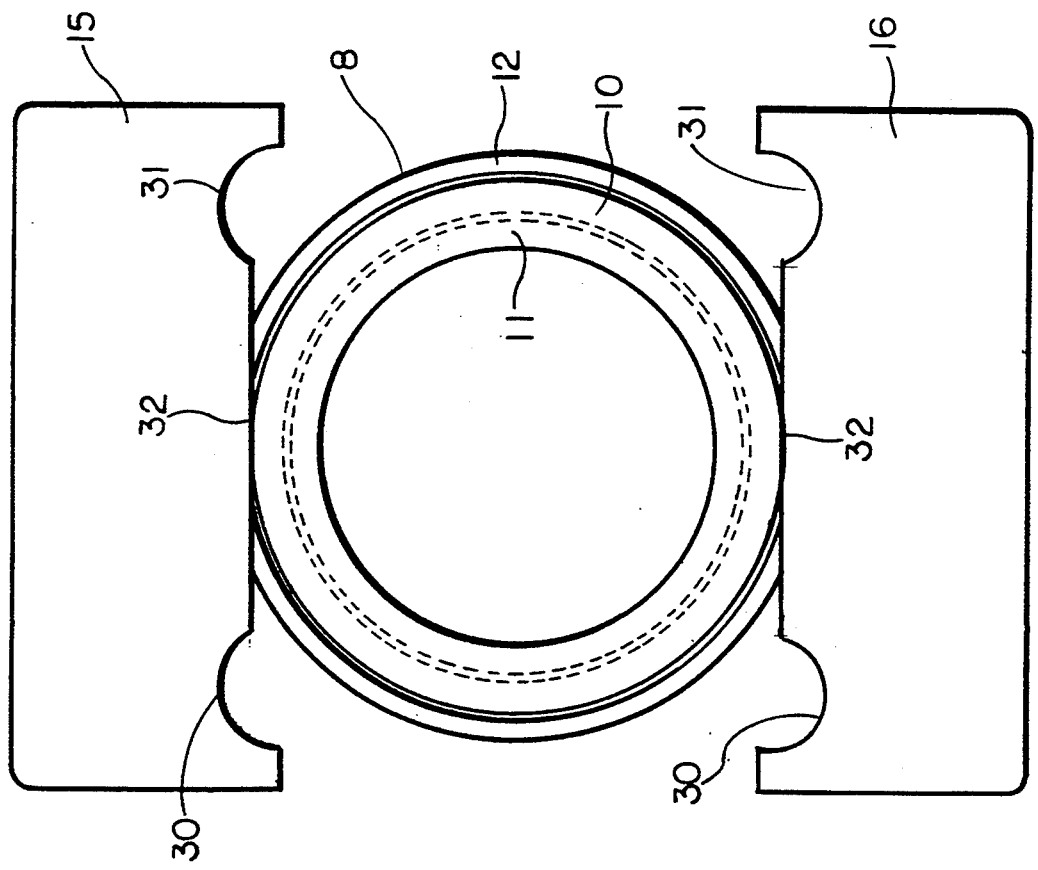
FIG. 3 is an end elevation of opposing jaw members of the vane in an open configuration.
Figure 5:
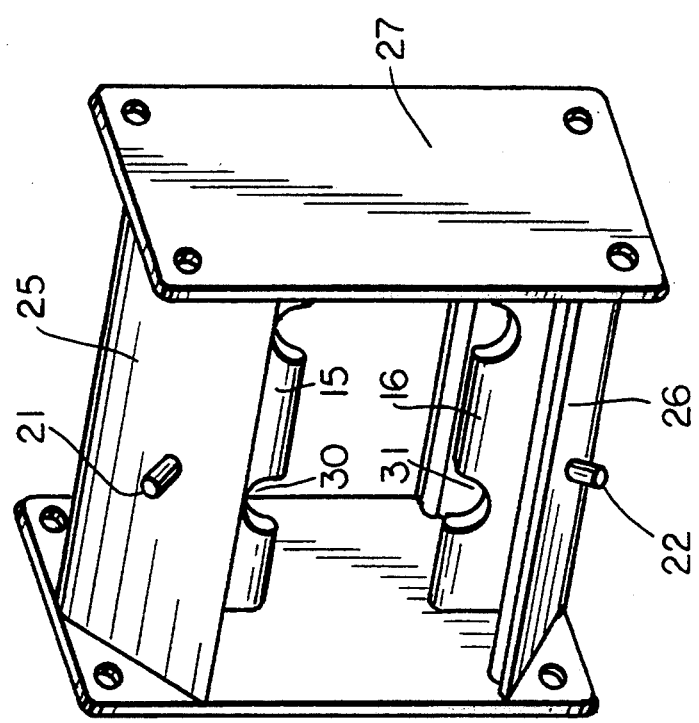
FIG. 5 is a perspective view of the vane closure in an open position without a valve sleeve interposed.

The closure jaws 15 and 16 are provided with rectilinear or straight edge portions 32 having rounded notches 30, 31 at each end of edge 32, as illustrated in FIGS. 3, 4, and 5. The notches 30, 31 eliminate or substantially reduce the crushing effect which develops when a valve sleeve is compressed. As aforementioned, this is a serious defect in many of the pinch valves currently in use. The closure jaws 15 and 16 are substantially flat members and the edge portions 32 are slightly rounded as shown at 40 and 41.

Other advantages of the invention will become apparent to those skilled in the art and numerous structural modifications and adaptations will become evident which do not depart from the scope and fair meaning of the invention as described hereinabove and as defined by the following claims.

What is claimed is:

1. A valve for use in regulating flow of fluid through a conduit having a deformably resilient valve sleeve, said valve comprising
   a) a housing defining first and second cavities, each of said first and second cavities being substantially triangular in cross section;
   b) jaw member means within the housing comprising at least first and second opposing jaw members for at least partially encircling the conduit with the first and second jaw members disposed transverse to the conduit and for deforming the valve sleeve of the conduit with the conduit sandwiched between the first and second opposing jaw members, said jaw member means being movable between an open position with the first and second jaw members spaced apart a distance sufficient to permit flow of fluid through the conduit and a closed position with the jaw members urged together sufficiently to restrict the flow of fluid through the conduit, and
   c) inflatable diaphragm means having deflated and inflated configurations for controlling movement of the jaw member means between said open position with the diaphragm means in said deflated configuration, and said closed position, with the diaphragm means in said inflated configuration, said diaphragm means comprising first and second diaphragms disposed within said first and second cavities respectively, said first and second diaphragms substantially filling said first and second cavities respectively when the diaphragm means is in said inflated configuration.

2. A valve as claimed in claim 1 wherein the first and second jaw members have edges for engaging and deformably compressing the valve sleeve of the conduit without crushing the conduit to a point where it fractures or delaminates.

3. A valve as claimed in claim 2 wherein the edges of said first and second jaw members are straight and have end notches so that when the jaw members are displaced towards one another, the jaw members deform the valve sleeve more at said edges than at said notches.

4. A valve as claimed in claim 3 wherein the notches of the first and second jaw members are aligned relative to the straight edges and relative to each other such that the jaw members deform the conduit valve sleeve to a dumbbell shape in cross section with the jaw member means in said closed position.

5. A valve as claimed in claim 4 wherein and the first and second cavities are each substantially triangular in cross section, and wherein the first and second diaphragms substantially fill said first and second cavities respectively with the diaphragm means in said inflated configuration.

6. A valve as claimed in claim 5 wherein said diaphragm means further comprises nozzle means for introducing pressure fluid into said first and second inflatable diaphragms to inflate the diaphragms, said nozzle means comprising a first nozzle attached to said first diaphragm and a second nozzle attached to said second diaphragm.

7. A valve as claimed in claim 6 wherein the housing has first and second openings through which the first and second nozzles extend.

8. A valve as claimed in claim 1 wherein said first and second jaw members are substantially flat and have rectilinear edges facing one another to squeeze said conduit when the jaw members are moved to said closed position.

* * * * *